United States Patent [19]
Bruce et al.

[11] 3,720,465
[45] March 13, 1973

[54] ELECTROPHOTOGRAPHIC APPARATUS WITH SYNCHRONIZED DOCUMENT ILLUMINATION AND SCANNING FEATURE

[75] Inventors: George D. Bruce; Ronald V. Davidge; Raymond L. Fowler; George W. Hobgood, Jr.; Henry C. Locklar, Jr.; George W. Van Cleave, all of Lexington, Ky.

[73] Assignee: International Business Machines Corporation, Armonk, N.Y.

[22] Filed: Nov. 20, 1970

[21] Appl. No.: 91,447

[52] U.S. Cl. ........................355/8, 355/47, 355/66
[51] Int. Cl. ...........................................G03g 15/04
[58] Field of Search ..........355/47, 8, 65, 66; 95/12.5

[56] References Cited

UNITED STATES PATENTS

| | | | |
|---|---|---|---|
| 2,600,168 | 6/1952 | Klyce | 95/45 |
| 3,345,926 | 10/1967 | Tiger et al. | 355/8 |
| 3,203,328 | 8/1965 | Brueggeman | 355/47 |

*Primary Examiner*—John M. Horan
*Attorney*—Hanifin and Jancin and D. Kendall Cooper

[57] ABSTRACT

The optical illumination and scanning system for document reproduction consists of two rotatable mirrors mounted in fixed side-by-side relationship. A light source illuminates the first mirror which reflects the light to a section of an original document. This light is reflected by the document to the second mirror which reflects this return beam through a lens system to a photoconductor surface. The mirror assembly oscillates across the entire original without changing the fixed relationship between the light beam reflected to the original and the return beam focused on the photoconductive surface.

2 Claims, 9 Drawing Figures

PATENTED MAR 13 1973 3,720,465

INVENTORS
GEORGE D. BRUCE
RONALD V. DAVIDGE
RAYMOND L. FOWLER
GEORGE W. HOBGOOD, JR.
HENRY C. LOCKLAR, JR.
GEORGE W. VANCLEAVE

BY D. Kendall Cooper

ATTORNEY.

ELECTROPHOTOGRAPHIC APPARATUS WITH SYNCHRONIZED DOCUMENT ILLUMINATION AND SCANNING FEATURE

BACKGROUND OF INVENTION AND PRIOR ART

The following U. S. Pat. Nos. are representative of the prior art: 2,508,650 3,072,798 3,184,847 3,205,367 3,360,659.

Other art of interest in U. S. Pat. No. 3,345,926 which shows a parabolic reflector 42 to focus the light source and scanning mirror 43 which directs the light source across the original and to the photoconductive surface. U. S. Pat. No. 3,062,109 shows a light shield used in conjunction with moving lamps in a photocopying device for keeping stray light from the source of illumination; U. S. Pat. No. 3,364,816 shows the use of an elliptical mirror to focus light. U. S. Pat. No. 3,995,066 discusses the theory of anamorphotic system which includes mirrors 20 and 30 in FIG. 5 oscillating in synchronism.

U. S. Pat. No. 3,062,109 is representative of prior illumination and scanning systems. A scanning mirror is pivoted on an axis and rotates through an angle to scan a document placed atop a curved glass platen. The image of the document is projected onto a photoconductor drum by means of a lens assembly and stationary mirror. An aperture defines the width of the document area that is scanned. Twelve fluorescent aperture lamps are aimed toward the document. With this type of illumination, the entire document is evenly illuminated during the photoconductor imaging process.

The amount of illumination may be increased by adding four additional fluorescent lamps to the configuration shown in U.S. Pat. No. 3,062,109. However, calculations have shown that this addition will only increase the illumination achieved by approximately 13 percent.

SUMMARY OF THE INVENTION

In accordance with the present invention, electrophotographic apparatus is provided with illumination and optical scanning and projecting facilities that illuminate only a portion of the document as it is being scanned during operation. In a typical case, only 1/10 of the total area of the original document is actually illuminated, thereby enabling a significant reduction in the amount of illumination required in the system. To achieve this, the illumination source comprises an elliptical reflecting means which concentrates the light rays from the source to a linear confined area with relatively higher intensity than in prior systems. Reflector means are positioned in a manner to reflect the light rays from the light source to the original document, to thereafter receive reflected light from the document and convey the same through the projection facilities of the system to image the photoconductor surface. In a preferred arrangement, the illumination reflecting means and the image conveying means comprises a common reflector element mounted for rotation to effect a scanning of the original document. Thus, the concentrated illumination source and the reflected image are inherently synchronized in this manner thereby achieving a much more efficient imaging process than has heretofore been attainable. Auxiliary means are provided in the illumination housing to further concentrate the light rays from the source in the manner described. In an alternative version, separate mirrors are moved in synchronism.

OBJECTS

Accordingly, a primary object of the present invention is to provide an electrophotographic system with a highly efficient illumination and document scanning facility.

Another object of the invention is to provide a concentrated illumination and synchronized scanning system for electrophotographic apparatus.

The foregoing and other objects, features, and advantages of the invention will be apparent from the following more particular description of the preferred embodiments of the invention as illustrated in the accompanying drawings.

DRAWINGS

In the drawings:

FIG. 5 shows a unitary rotating reflecting mirror useful in the system of FIG. 1, while

DETAILED DESCRIPTION

The High Speed Copier System

Figure 1:
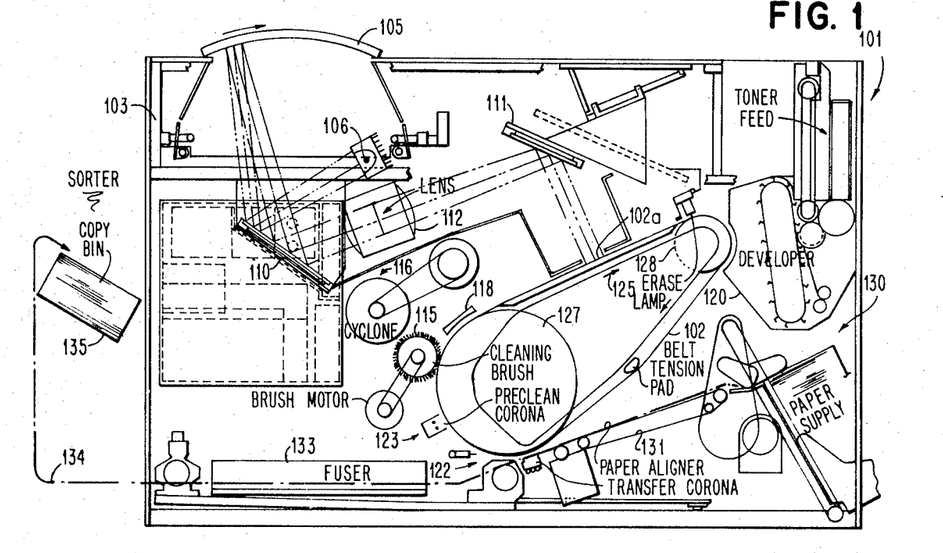
FIG. 1 is a schematic diagram of a high speed copier system utilizing a photoconductive belt for the conveyance of images produced thereon from an original document.

FIG. 1 illustrates a high speed copier unit 101 incorporating the present invention. The unit includes a photoconductor belt 102 and having a main frame 103 supporting various elements for producing a multitude of copies at high speeds from original documents. An original is positioned on the original document plane 105 and illuminated by a lamp 106 in timed relation with movement of belt 102. An optical system including mirrors 110 and 111 and lens element 112 project the image of the original toward an image plane 102a on belt 102.

The unit in FIG. 1 has the customary electrophotographic stations and facilities for producing copies. These include a cleaning brush 115 with associated cyclone cleaning system 116, a charge corona station 118, the image plane 102a, previously mentioned, a developer station 120, a transfer station 122, and a preclean corona station 123. Belt 102 is mounted for movement as indicated by arrow 125 on drum driving elements 127 and 128. A paper supply 130 accommodates a large quantity of individual sheets of paper that are fed by various devices including a belt 131 to the transfer station 122 for transfer of images in timed relation with movement of belt 102. Following such transfer, the image is fused by fuser 133, passes by transportation means 134, not shown, to a completion station, such as a sorter copy bin 135.

The Illumination and Projection System

The photoconductor imaging process is achieved by illuminating only the portion of the document which is scanned during this process. Since the scanned area is only about 1/10 the total area of the document, the amount of illumination required may be greatly reduced.

Figure 2:
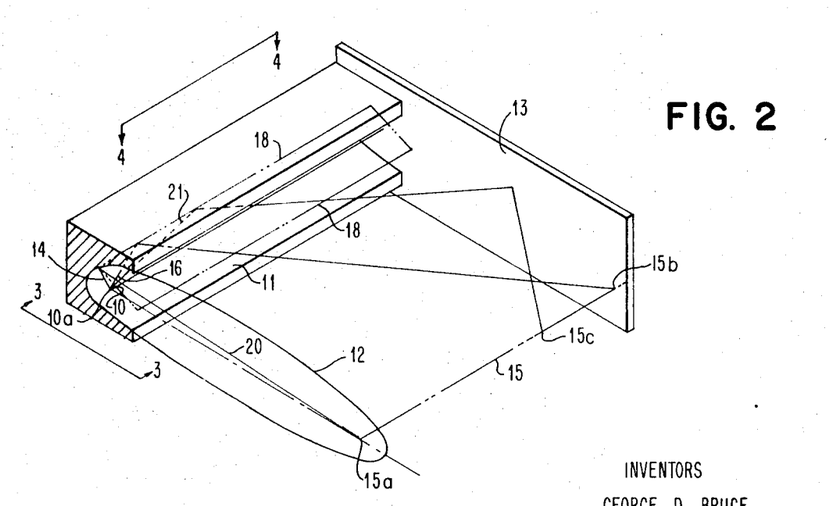
FIGS. 2 and 3, along with FIG. 4, illustrate an illumination source and light concentrating facility for the system of FIG. 1.
Figure 3:
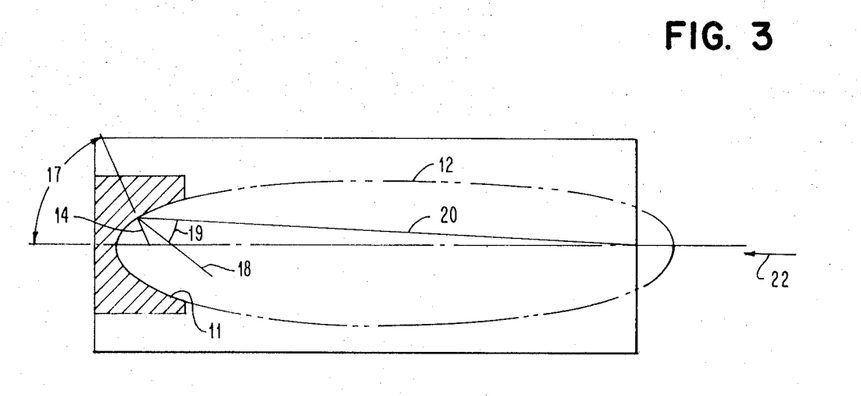

The method used to illuminate the portion of the document being scanned will now be discussed with reference to FIGS. 2, 3, and 4. The source of illumination will first be considered an idealized line source 10 located at one of the foci of an elliptical reflector, that is, a part having reflective surfaces 11 following a portion of elliptical curve 12 which is perpendicular to line source 10. FIGS. 2 and 3 show this reflector cut in the plane of ellipse 12. A pair of flat end reflectors having reflective surfaces 13 perpendicular to the line source are placed at either end of the elliptical reflector.

Due to the nature of the ellipse, any ray 14 emanated from the line source at point 10a in the plane of ellipse 12 striking reflective surface 11 will be reflected to point 15a, the other focus of the ellipse. It will now be shown that all rays emanating from the line source and striking the reflective surface of the elliptical reflector will be reflected through line 15, the extension of this focus. Consider another ray 16 emanating from point 10a at the same angle 17 as shown in FIG. 3, but at a different angle in a plane perpendicular to that shown in this figure. Thus, rays 14 and 16 both strike the reflective surface where its normal is defined by the plane shown with lines 18, the edge of which appears in FIG. 3. By the law of reflection, the angle of reflection as seen in FIG. 3 with respect to this plane remains as it was for ray 14, that is, angle 19. Thus, the reflected ray also travels along the plane established by line 20 in FIG. 3, striking line 15 at point 15b.

Now consider another ray 21 emanating from point 10a at the same angle 17 shown in FIG. 3. After reflection off the elliptical reflector, this ray also travels in the plane established by line 20 in FIG. 3, striking end reflective surface 13. This plane is perpendicular to this reflective surface. If this plane is viewed from its edge in the direction of arrow 22, it can be seen that the angle of incidence with respect to a normal drawn on this plane is zero. The angle of reflection is therefore also zero as thus viewed, so the reflected ray remains in this plane, striking line 15 at point 15c.

Because point 10a and angle 17 were arbitrarily chosen, it can be seen that any ray emanating from line source 10 and striking reflective surface 11 is reflected through line 15.

Figure 4:
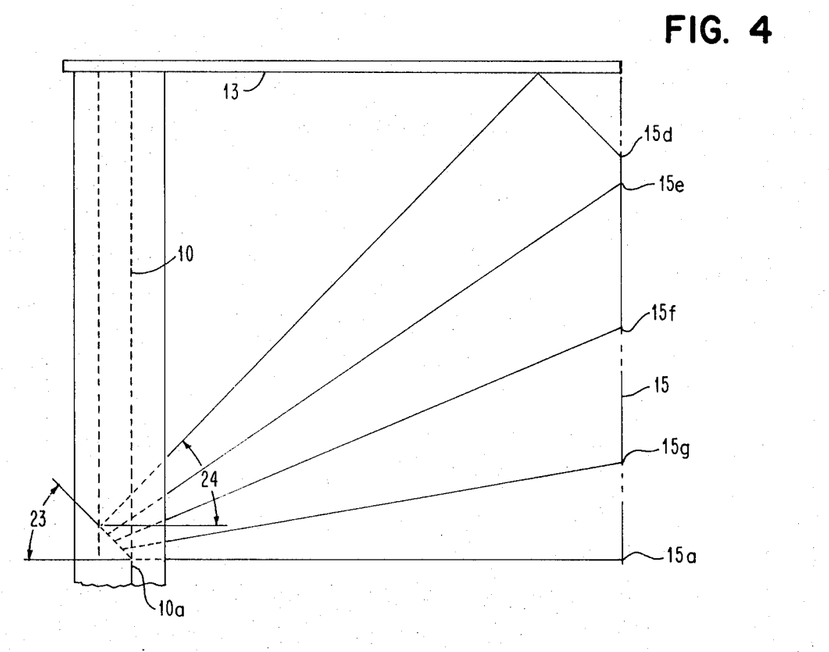

FIG. 4 is a top elevation of the system, that is, a view taken in the direction shown by section lines 4—4 in FIG. 2. FIG. 4 shows several rays emanating from point 10a in a plane established by angle 23. The ray emanated vertically from point 10a is reflected to point 15a of line 15. The ray emanating backward horizontally in this view is reflected at angle 24, which is equal to angle 23, to strike line 15 at point 15d. The other rays are reflected to cross line 15 at points 15e, 15f, and 15g. Any point 10a of the idealized line source emanates light of equal intensity at all angles 17 and of varying intensity at all angles 23. Thus, any point on the line source illuminates all points on line 15 with varying intensities. If the distance between lines 10 and 15 is sufficiently great, relatively constant illumination may be obtained along line 15 when the line source at 10 is replaced by a series of lighted segments. This is important because the total width to be illuminated along line 15 is much greater than the filament length of an efficient tungsten lamp which could be used for document illumination. It is also possible to place lighted segments near the ends of line 10 to help compensate for light losses inherent in the lens systems used in copying machines.

Although the illumination from an ideal line source as described is focused on line 15, the illumination from any real source is spread over an area in the vicinity of line 15. Depending on the geometry of the light source and the reflector, this area can be great enough to include the area scanned by the copying process. The document to be copied may otherwise be placed at some distance from line 15 to increase the illuminated area.

Figure 5:
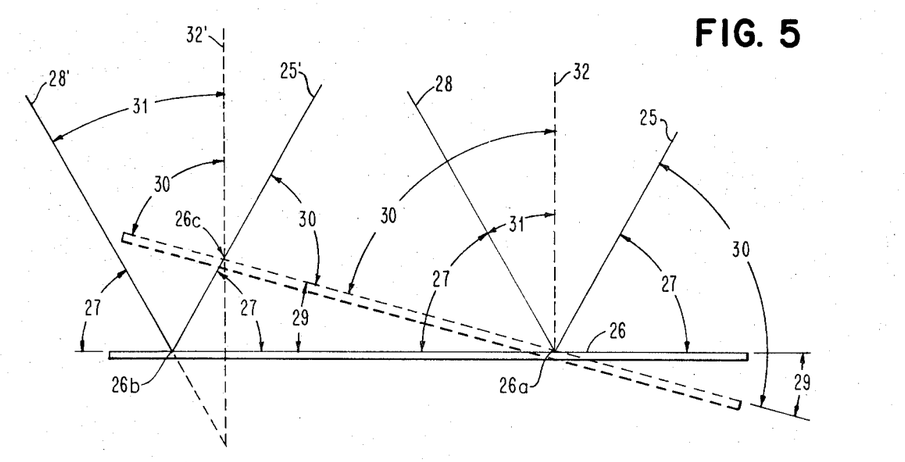

In the proposed illumination system, light from the reflector system described in the preceding paragraphs is deflected to follow the document scanning by means of a rotating flat mirror. The angular deflection of light by such a mirror will now be discussed with reference to FIG. 5. Consider a light ray 25 striking reflective surface 26 at the pivot point of rotating mirror 26a and at an angle 27 with respect to the plane of the mirror. By the law of reflection, this ray is reflected as ray 28 at the same angle 27 as shown. Now consider the mirror rotated through angle 29. Ray 25 now strikes the mirror at angle 30 with respect to its plane and is reflected as ray 32 at the same angle as shown. Thus, the rotation of the mirror deflects the reflected ray from its original position through angle 31. From the drawing, it can be seen that:

(angle 30) = (angle 27) + (angle 29), and (angle 31) = (angle 29) + (angle 30) − (angle 27)

Substituting the first equation into the second, it can be seen that:

(angle 31) = 2(angle 29)

Now consider another ray 25' parallel to ray 25 striking the mirror in its original position at point 26b at the same angle 27 and reflected as ray 28' at the same angle 27. After the mirror is rotated through angle 29, this ray strikes the reflective surface at a new point 26c at the angle 30 as before and is reflected back at this angle as ray 32'. Since the angles of reflection are the same as those achieved with ray 25, ray 28' is parallel to ray 28 and ray 32' is parallel to ray 32. Therefore, the motion of the mirror through angle 29 deflects ray 32' through the same angle 31 which is equal to twice angle 29.

In the illumination systems proposed herein, the document is illuminated from the elliptical reflector system by means of a flat illumination mirror rotating with the flat document scanning mirror. It will now be shown that, when the following conditions are met:

1. The two mirrors rotate together (as a solid part) about an axis in which the planes of their reflectors intersect, and, 2. the illumination mirror and the illumination source are spaced in a relationship so that at a given point, such as the start of the scanning operation, the area illuminated is the area scanned, the following results are obtained:

1. The illuminated area will follow the scanned area on the surface of the document curved into an arc of a circle having its center at the axis of rotation of the mirrors,
2. the length of the light path from the illumination source to the illuminated document area will remain constant during the scanning process,
3. the length of the light path from the illuminated document area to the lens will remain constant during the scanning process, and
4. the angle between these light paths measured at the document will remain constant during the scanning process.

Figure 6:
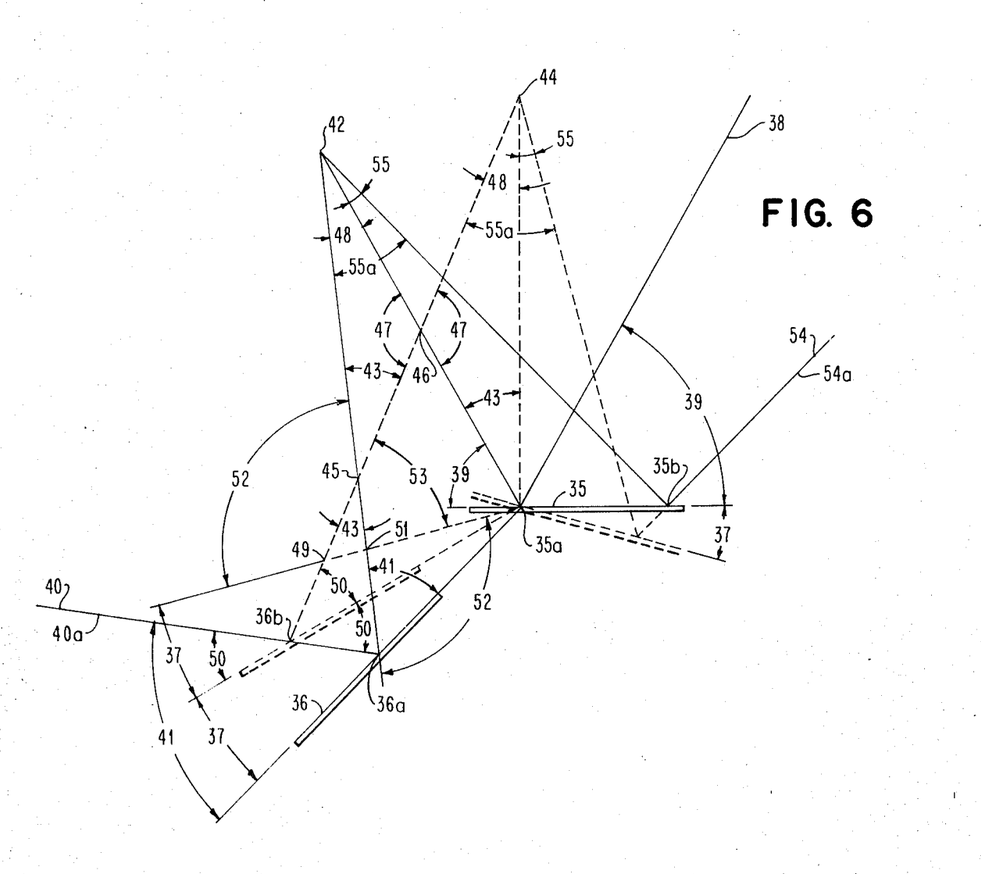
FIG. 6 shows two rotating reflecting mirrors as an alternative configuration.

FIG. 6 shows a pair of mirrors 35 and 36 rotated through angle 37 about an axis at 35a, the intersection of the planes of their reflectors. Consider a light ray 38 reflected from point 35a at angle 39 with respect to the plane of reflector 35. Consider another ray 40 reflected from point 36a at angle 41 with respect to the plane of reflector 36, so that the reflection of this ray crosses the reflection of ray 38 at point 42. It has been shown in reference to FIG. 5 that when the mirrors are rotated through angle 37, the reflections of both these rays will be deflected through angle 43, which is twice angle 37, to cross at point 44. Consider the triangle formed by points 42, 45, and 46 and the triangle formed by points 44, 35a, and 46. Since these triangles agree in two angles, 43 and 47, they are similar, and the remaining angles must be equal. Therefore, the reflections of the rays cross at the same angle 48 for both mirror positions.

Now consider a line drawn from point 35a at angle 37 with respect to the position of reflector 36 after it has been rotated through angle 37. This line crosses the reflection of ray 40 to point 44 at point 49. Due to the law of reflection, the angle 50 of ray 40 with respect to the plane of reflector 36 in this position is repeated in the triangle formed by points 36b, 35a, and 49. This triangle and that formed by points 36b, 35a, and 36a are alike in two angles, 37 and 50, and they share a common side, the line from 36b to 35a; so they are congruent.

Consider the triangle formed by points 51, 36a, and 35a. The angle of this triangle at point 35a is twice angle 37, which is equal to angle 43 as shown in reference to FIG. 5. This triangle has another angle 52 equal to the corresponding angle in the triangle formed by points 51, 49, and 45. Since these triangles agree in two angles, they are similar. Therefore angle 53 is equal to angle 41.

Because the triangle formed by points 36b, 35a, and 49 is congruent to the triangle formed by points 36b, 35a, and 36a; the line between points 49 and 35a is equal in length to the line between points 36a and 35a. The triangle formed by points 36a, 35a, and 42 therefore agrees with the triangle formed by points 49, 35a, and 44 in one side and two angles, so these triangles are congruent. The length of the line between points 42 and 35a is therefore equal to the length of the line between points 44 and 35a, so the point at which the reflected rays cross travels in an arc of a circle with its center at 35a as the mirrors are rotated.

Now consider the light path distance between a point 40a on the lines of light ray 40 and the points at which the rays cross, 42 and 44. When the mirrors are in their original position, this distance is equal to the sum of the lengths of the lines between points 40a and 36b, between 36b and 36a, and between 36a and 42. When the mirrors are rotated through angle 37, this distance is equal to the sum of the lengths of the lines between points 40a and 36b, between 36b and 49, and between 49 and 44. However, due to the congruence of the triangle formed by points 36b, 35a, and 36a, with the triangle formed by points 36b, 35a, and 49, the length of the line between points 36b and 36a is equal to that of the line between points 36b and 49. Also, due to the congruence of the triangle formed by points 36a, 35a, and 42 with the triangle formed by points 49, 35a, and 44, the length of the line between points 36a and 42 is equal to that of the line between points 49 and 44. Therefore, the light path distance from point 40a to the crossing point remains constant as the mirrors are rotated.

To this point, the discussion has considered a special case in which one of the rays was reflected from the axis of rotation of the mirrors. Now consider another ray 54 reflected at point 35b of reflector 35 in its original position and oriented to cross the other rays at point 42. The extension of reflector 35 to accommodate this ray may be considered a special case of the use of a separate reflector, such as reflector 36, with the angle between the reflectors equal to zero. The results shown for the crossing of the reflections of rays 40 and 38 must also apply for the crossing of the reflections of rays 54 and 38. That is, the reflection of ray 54 must also pass through point 44 after the rotation of the mirrors, the angle between the reflection of this ray and that of ray 38 must remain constant as shown by angle 55 during the rotation of the mirrors, and the light path distance from a point 54a on the line of ray 54 must remain constant during the rotation of the mirrors. Therefore, the total angle 55a between the reflections of rays 40 and 54 must remain constant.

Now imagine an illumination source placed at point 40a and directed along the line of ray 40 and a copying machine lens oriented to focus reflected rays, such as 54 on a photoconductive surface. The document to be copied is placed in an arc of a circle centered at point 35a passing through points 42 and 44. With this configuration, the illuminated area will follow the scanned area on the surface of the document, and during the scanning operation the length of the light path from the illumination source to the illuminated document will remain constant, the length of the light path from the illuminated document area to the lens will remain constant, and the angle between these light paths will remain constant.

The illumination source placed at 40a was arbitrarily located except for the condition that the reflection of its illumination crossed the light path back through the lens at the document area scanned. The intensity of illumination may be increased by directing several illumination sources toward the illumination mirror meeting this condition. Similarly, several responsive elements, such as lenses and light sensors may be directed toward the scanning mirror meeting this condition. If required, several mirrors may be arranged so the planes of their reflectors all pass through the axis of rotation.

Figure 7:
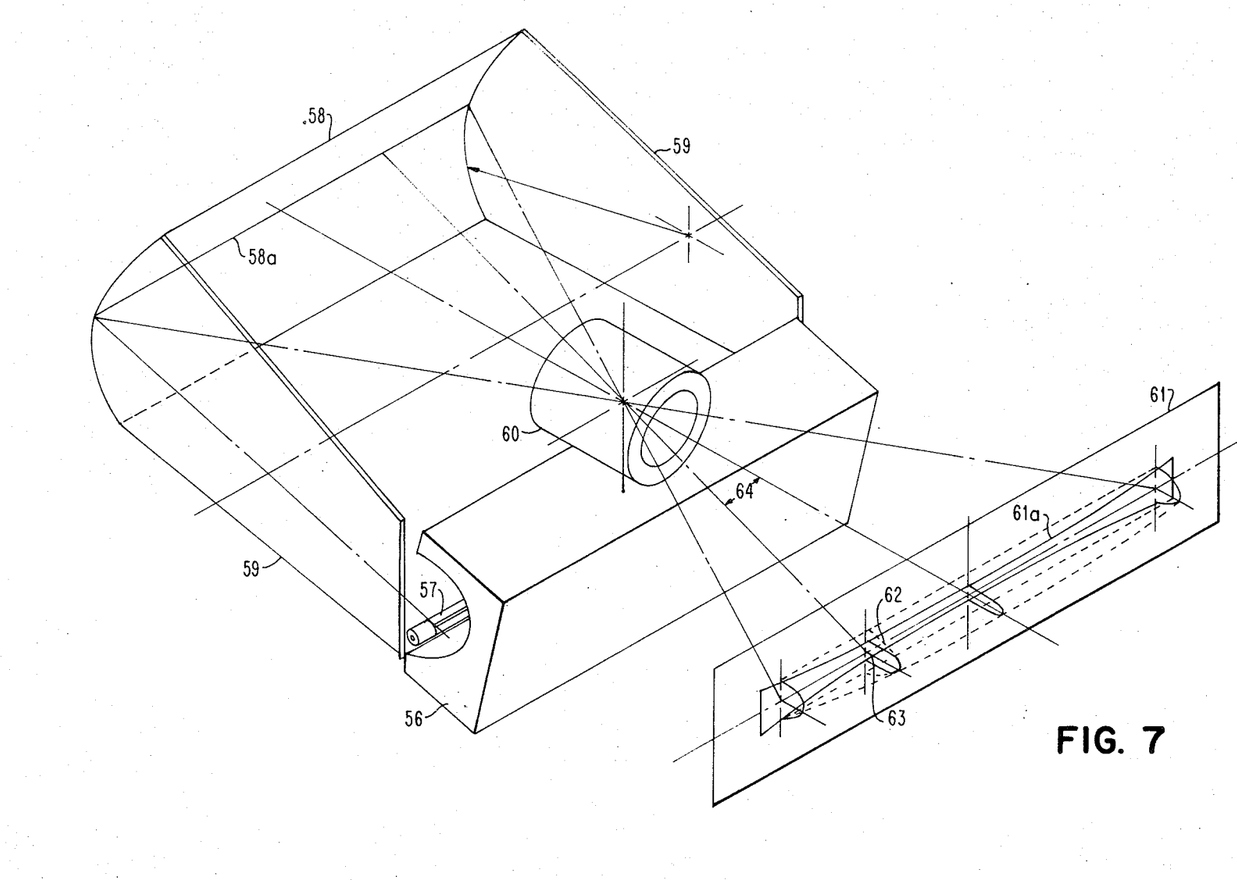
FIG. 7 is a schematic representation of the optical system of the electrophotographic apparatus with the document scanning and illumination mirrors removed.

It is necessary that the light path from the scanned document area to the lens remain constant to keep this area in focus. FIG. 7 shows why it is also necessary that the length of the light path from the illumination source to the illuminated document area remain constant. This figure shows schematically the optical system of the copying machine with the document scanning and illumination mirrors removed. Reflector 56 concentrates light from lamp 57 on an area of document 58 centered at line 58a. End reflectors 59 are also used as previously described. Reflected light from the document passes through lens assembly 60 and through slot 61a in aperture plate 61 to the photoconductor drum (not shown) which is located a short distance beyond the aperture plate.

Without considering the aperture plate, when a white document is used, reflector 56 produces a relative illumination profile on the exposed photoconductor area as shown by dashed lines 62. However, due to the nature of the optical system, for constant illumination of an area about line 58a, the illumination on the photoconductor drum at an arbitrary point 63 is proportional to the fourth power of the cosine of angle 64.

In other words, the amplitude of the relative illumination curves varies with this factor. The width of aperture slot 61a is increased as either of its ends is approached to compensate for this variation. The edges of this slot truncate the relative illumination curve so that a constant area is obtained under this curve for each arbitrary position 63.

If the length of the light path from the illumination source to the illuminated area of the document were allowed to vary during the scanning process, the ability of reflector 56 to concentrate light in the illuminated area would change with this variation. Thus, the amount of light passing through areas defined by the width of slot 61a would change during the scanning process. A variation in the angle between this light path and the path back through the lens to the photoconductor would also change the amount of illumination seen at the photoconductor.

Figure 8:
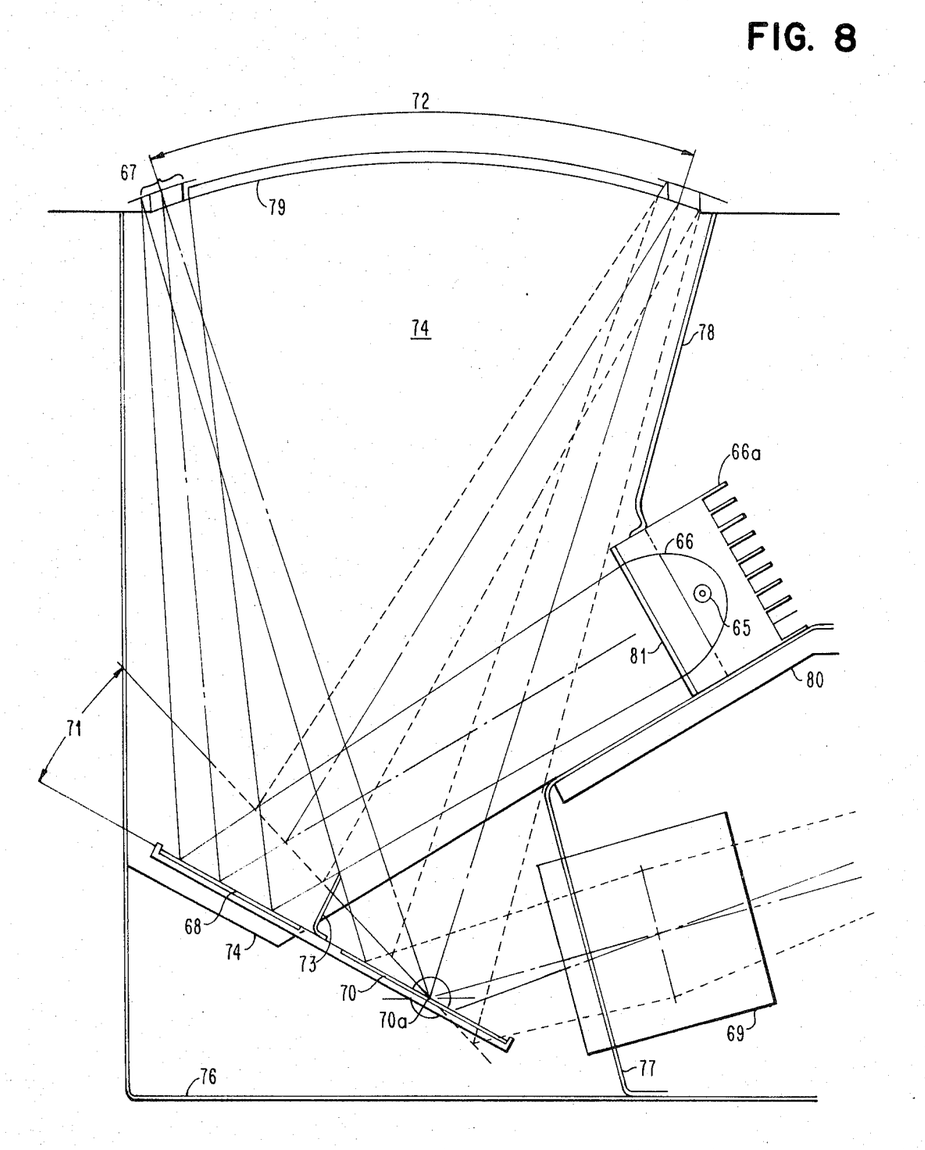
FIGS. 8 and 9 are more complete versions of the illumination and scanning facilities utilizing the unitary reflecting mirror of FIG. 5 and the two mirrors of FIG. 6, respectively.

FIG. 8 shows one of the configurations of the illumination system proposed in this disclosure. Light from lamp 65 is concentrated by elliptical reflector 66 and directed to area 67 by illumination mirror 68 at the beginning of the scanning operation. Light from area 67 is diffusely reflected back through lens assembly 69 by means of illumination mirror 70. During the scanning operation, these mirrors rotate together through angle 71 about an axis at 70a rotating the illuminated and scanned area through angle 72, which is twice angle 71.

The axis of rotation for the mirrors is shown at the center of the area used for scanning. However, since the mirrors lie in the same plane, intersecting at all points in this plane, the axis may alternately be placed elsewhere in this plane.

The possible presence of dust on the illumination mirror presents a potential problem referred to as flare. Since the intensity of light striking the illumination mirror is much greater than that striking the document scanning mirror, dust particles on the illumination mirror could direct scattered light back through the lens, affecting the photoconductor imaging. A flare shield 73 is placed on the rotating mirror assembly as shown to prevent this possibility. This opaque shield blocks light that might travel from the illuminated surface of the illumination mirror through the lens.

End reflectors 74 are used as previously described.

To prevent the accumulation of dust on the mirrors and on the lens, this portion of the optical system may be sealed by the use of covers 76, 77, and 78 and by the curved glass document platen 79. The elliptical reflector may then be cooled by blowing air along its fins 66a. An insulating heat shield 80 is included to reduce the radiation of heat to the lens assembly. If it is necessary to cool the lamp itself, a glass plate 81 may be placed in front of the reflector as shown. Air is then blown along the lamp and the reflective surface of the reflector from one end to the other. This glass plate may also be used to absorb infrared energy, reducing the temperature of the rest of the chamber shown.

Figure 9:
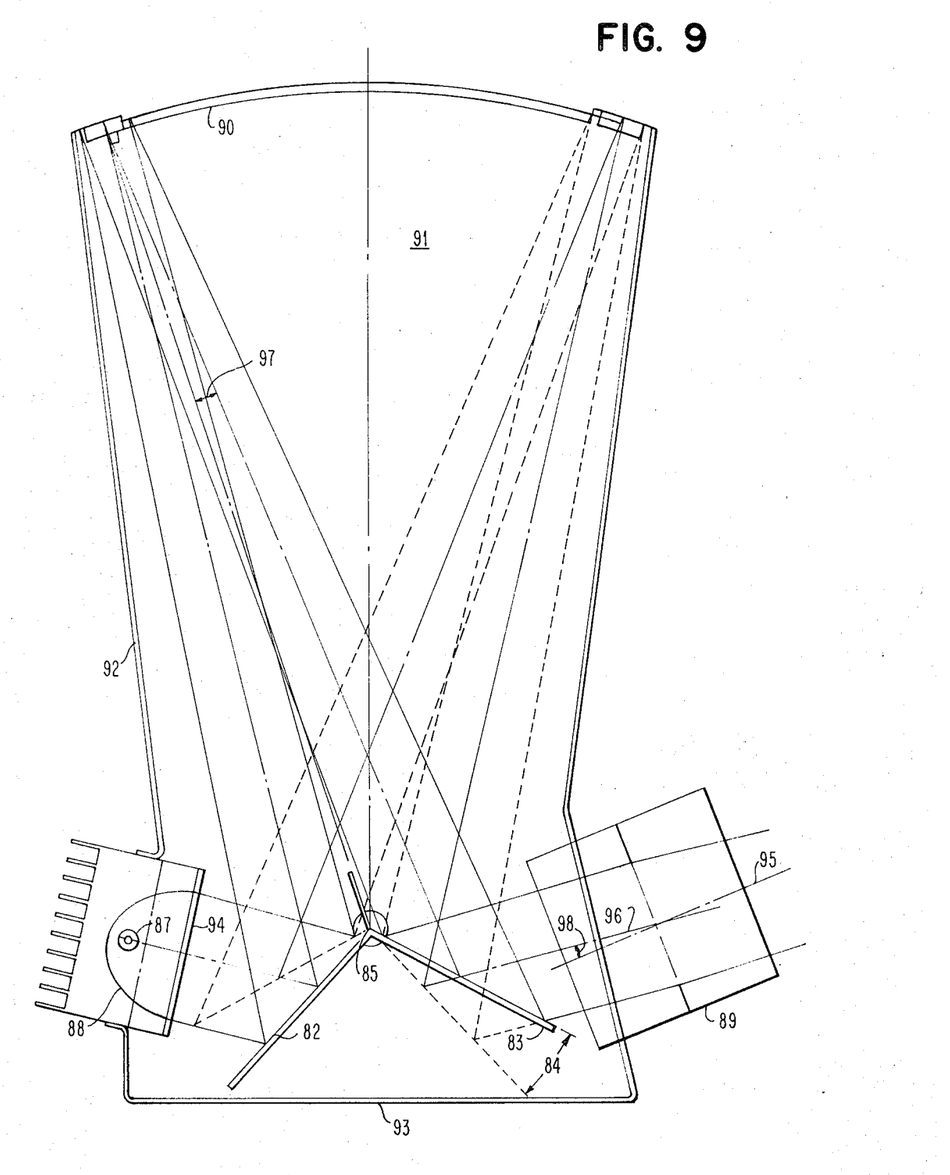

FIG. 9 shows an alternate configuration, with illumination mirror 82 and document scanning mirror 83 rotating through angle 84 about an axis at 85, the intersection of the planes of their reflectors. An opaque shield 86 is rotated with these mirrors to keep stray light from lamp 87 and reflector 88 away from lens assembly 89. This configuration is otherwise similar to that shown in FIG. 8, with a curved glass document platen 90 forming an arc of a circle centered at axis 85, with end reflectors 91, with covers 92 and 93 sealing the optical chamber, and with a glass plate 94. Lens assembly 89 is tilted so that its optical centerline is perpendicular to the surface of the document on platen 90 as reflected from mirror 83. As an example, lens 89 may, in a typical case, be tilted 5° with respect to line 96 to establish this relationship. In other words, angle 93 between the centerline of the reflected image and the center of the curved document surface at 85 equals angle 98 through which the lens is tilted relative to the reflection of the center of the scanned area.

While the invention has been particularly shown and described with reference to several embodiments, it will be understood by those skilled in the art that various changes in form and detail may be made without departing from the spirit and scope of the invention.

What is claimed is:

1. Electrophotographic apparatus having facilities for scanning operations with respect to an original document in order to produce copies from said document, comprising:
   means for supporting said original document on a curved surface for scanning;
   a rotating reflector element having planar reflective surfaces said rotating reflector element comprising a pair of mirrors, one of said mirrors serving as an illumination mirror, and the other of said mirrors serving as a light reflecting mirror;
   means mounting said mirrors for independent but synchronized scanning rotation within a predetermined range of scanning and about an axis that is in parallel with respect to said curved surface for the transmission of light and image information, said axis of rotation being arranged so that a constant predetermined distance is maintained between said axis and said curved surface throughout a scanning operation;

a primary source of illumination;

means supporting said primary source of illumination for direction of light rays emanating therefrom toward said illumination mirror for reflection from said illumination mirror to said original document;

a lens element;

means to project light rays from said source to said document and receive reflections from said document for conveyance to said lens element for imaging purposes comprising means positioning said lens element in light conveying relationship with respect to said light reflecting mirror, said lens element being oppositely positioned with respect to said light source to form a generally symmetrical arrangement in relation to the axis of rotation of said reflector element, the arrangement being such that light from said light source is projected along a first light path of constant length to said reflector element, thence to said original document and at a first angle junctured at said axis of rotation, and image information from said document is reflected thereafter along a second light path of constant length back to said rotating reflector element and thence through said lens element to an imaging area and at a second angle junctured at said axis of rotation that is equal to said first angle, said first and second angles combining to form an angle junctured along said curved surface that remains constant throughout scanning operations; and means for driving said rotating reflector element in timed relation to scan said original document for imaging purposes, thereby illuminating the area scanned on said original document throughout the scanning operation with a light path of constant length from said document area to said lens, as well as maintaining constant the first and second angles of said light paths with respect to said axis of rotation throughout the entire range of scanning.

2. The apparatus of claim 1, wherein said mirrors are mounted to establish congruent triangular light transmission paths throughout the range of scanning of said mirror elements to insure that the light path travelled from said source to said lens element remains constant throughout scanning.

* * * * *